Sept. 15, 1959 — F. C. ALBRIGHT — 2,904,135
BRAKE CONTROL DEVICE
Filed July 21, 1951 — 2 Sheets-Sheet 1

INVENTOR.
FRANKLIN C. ALBRIGHT
BY
ATTORNEY

Sept. 15, 1959     F. C. ALBRIGHT     2,904,135
BRAKE CONTROL DEVICE

Filed July 21, 1951     2 Sheets-Sheet 2

INVENTOR.
FRANKLIN C. ALBRIGHT
BY
*G A Gust*
ATTORNEY

United States Patent Office 2,904,135
Patented Sept. 15, 1959

2,904,135
BRAKE CONTROL DEVICE

Franklin C. Albright, South Bend, Ind., assignor to Bendix Aviation Corporation, South Bend, Ind., a corporation of Delaware Application July 21, 1951, Serial No. 237,864

16 Claims. (Cl. 188—181)

The present invention relates to a brake control device and more particularly to a device which controls the rate of braking deceleration of a vehicle or of a rotating body.

It is well known, that braking deceleration of a vehicle wheel is dependent upon the frictional engagement of the wheel with the ground surface. Furthermore, it is well known that a locked or skidding wheel will not produce maximum deceleration, and that such deceleration is attained at a value of braking pressure which still permits the wheel to rotate but is just below that value which will cause locking or skidding of the wheel. In vehicle operation, it has been found that skidding wheels are dangerously unsteerable and often result in tire blow-outs, and that either or both of these results has been the cause of serious accidents.

Many devices have been developed for controlling the braking pressure actually applied to the brakes in order to prevent wheel skidding, among which are those which incorporate electrical mechanism operable to regulate the pressure reaching the brake. In the known devices, when a certain rate of deceleration or braking torque has been reached or exceeded, the application of pressure to the brake or brakes is severed with the pressure already in the brakes being permitted to rapidly (and in almost all instances, immediately) bleed off to either wholly or partially release the brakes. This action is then followed by the device allowing another pressure increase in the brake until the aforementioned rate of deceleration or braking torque is reached. With these arrangements, the functions thereof take on the character of a rapid, alternate application and release of the brakes with the braking pressure actually oscillating sharply between relatively high and low values. This sharply oscillating pressure condition at the brake is obviously undesirable; therefore, it is a principal object of this invention to provide a modulated braking pressure and thereby provide a uniform rate of deceleration for obtaining maximum effectiveness of the brakes.

It is another object to provide a hydraulic control device automatically operable to prevent skidding of a wheel when the brake is applied.

It is still another object to provide an anti-skid device which is reliable and consistent in its operation and which is relatively economical and simple in construction.

Still further objects will become apparent as the description proceeds.

Figure 1:
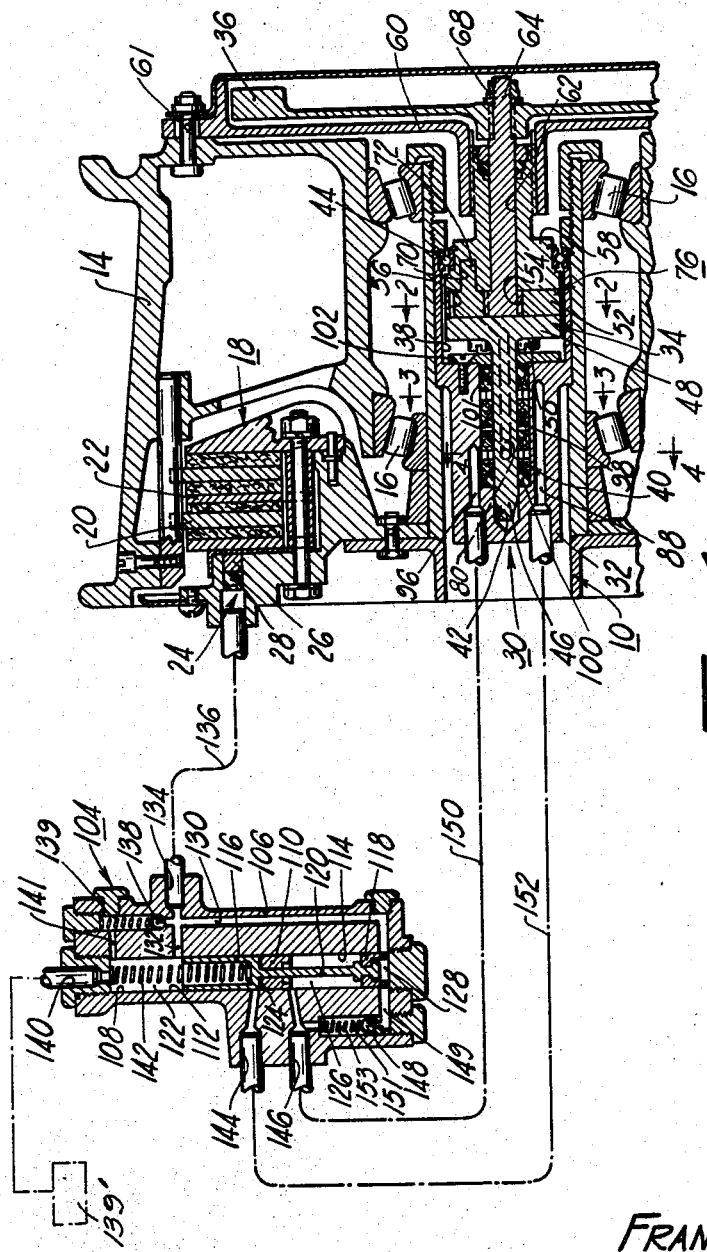
Figure 1 is a sectional illustration of an embodiment of the present invention as it is applied to an aircraft wheel and brake assembly.

Referring to the drawings, a stationary or non-rotatable axle 10 is adapted to be secured at its left end to the lower extremity of a strut or the like (not shown) depending from the understructure of an aircraft. A conventional wheel 14 is journaled on said axle by means of spaced bearings 16, and a disc brake 18 comprised of rotatable and non-rotatable friction elements 20 and 22 respectively, is operatively associated therewith and also may be of conventional arrangement. For an example of a wheel and brake assembly which may be used in the present invention, reference may be had to Du Bois application Ser. No. 647,781 filed February 15, 1946, now Patent No. 2,551,252. A hydraulic brake actuator 24 comprised of an annular piston 26 and sealing ring 28 is situated to control the engagement of the friction elements 20 and 22 for applying the brake.

The sensing portion of the present invention is constituted by a valve mechanism generally indicated by reference numeral 30, which may be housed completely within the axle 10. In general it consists of three relatively movable parts, a non-rotatable supporting member or pump support 32, a rotatable member or pump housing 34 rotatable with the wheel 14, and an inertia element or fly wheel 36. The pump support 32 is rigidly and concentrically mounted inside axle 10 and is provided with a stepped diameter bore which provides three sockets 38, 40, and 42.

The pump housing 34 is journaled within the bore of support 32 by means of the bearing 44 and other bearing members to be described hereafter. This housing 34 is made of several pieces and is generally cylindrical in shape with a spindle 46 projecting from the left end thereof into the support sockets 40 and 42, the socket 42 and spindle 46 being coaxially related. The right end of this spindle 46 terminates in a flange 48 secured by means of screws 50 to a gear housing 52 provided with two connecting circular chambers 54 and 56, chamber 54 being concentric with the axis of rotation of housing 34 and chamber 56 being radially offset therefrom. The screws 50 also serve to rigidly fasten the flange 48 and housing 52 to a journal portion 58 which is rotatably supported inside bearing 44. Splined to the right end of journal portion 58 is an annular plate 60 which is bolted to the outer face of wheel 14 by means of bolts 61 making the pump housing 34 rotatable with the wheel.

The pump housing journal or spindle 58 is provided with an axial bore 62 which opens into the chamber 54, and which receives for rotation a small axle or shaft 64. This shaft 64 carries on its left end a gear part or pinion 66 (see Figure 2) which is closely fitted for rotation in chamber 54. On the right end of shaft 64 is secured with inertia element or fly wheel 36 having a mass which will produce the result to be hereinafter described. For ease in assembling and disassembling the mechanism, fly wheel 36 is secured on shaft 64 by means of a nut 68.

Spindle portion 58 is provided with another bore 70 coaxially disposed with respect to chamber 56 so as to rotatably receive the pin extension 72 of pinion 74, this latter pinion having a close rotatable fit in chamber 56 and being meshed with pinion 66. The combination of the chambers 54, 56 and the respective meshed pinions 66, 74 constitute a gear pump or, in other words, a constant volume displacement pump so called because for a given rate of rotation, the pinions coact to deliver a certain volume of liquid at a corresponding rate. It is of course to be understood that any similar constant displacement pump may be used, the only limitations on pump design being those necessary to effect the desired result to be hereafter explained.

Figure 3:
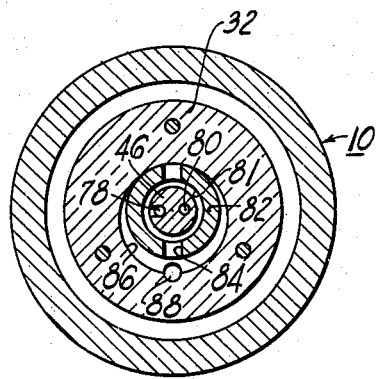
Figure 3 is a similar section of Figure 1 taken substantially on section line 3—3.

The gear pump, generally designated by the reference numeral 76, is reversible and opens into two oppositely disposed passages 78 and 80 which alternatively serve as inlet and outlet passages. Passage 78 extends down and through the spindle 46 and opens into an annular chamber 81 (see Figure 3) formed between spindle 46 and a brass or the like bearing ring 82. This ring 82 is ported as at 84 into an eccentric cavity 86 formed in the pump support 32 which in turn leads into a passage 88.

Figure 4:
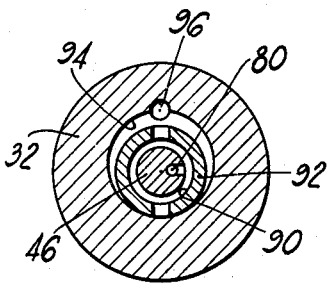
Figure 4 is another similar section of Figure 1 taken substantially on section line 4—4.
Figure 5:
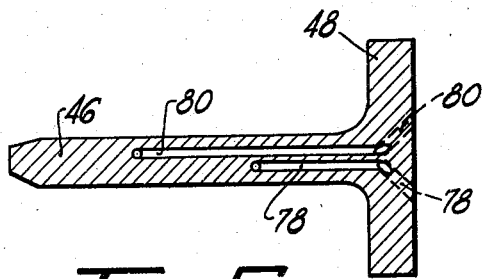
Figure 5 is an axial section of a spindle part of Figure 1.

Similarly, the passage 80 extends through spindle 46 and opens into an annular chamber 90 formed in ring 92 (see Figure 4). Chamber 90 is turn opens into an eccentric cavity 94 formed in support 32 which is in communication with a passage 96. Rubber or the like sealing rings 98 are interposed between the bearing rings 82 and 92 and a similar ring 100 is inserted between the end of pump support socket 40 and ring 92. Another sealing ring 101 fits between an annular plate 102 secured to the bottom of socket 38 and ring 82. In general it might be stated that the primary purpose of the socket 40 and the axially arranged rings 82, 92, 98, 100, and 101 is to provide a swivel fitting or coupling for communicating the fluid pressure of the rotatable gear pump 76 to a non-rotatable set of passages 88 and 96. Obviously any suitable arrangement of fluid coupling would serve the intended purpose. The bearing rings 82 and 92 are preferably snugly fitted into the pump support socket 40 and are formed to provide adequate journal support for the spindle 46. Thus it is seen that by causing relative rotation between the wheel 14 and fly wheel 36, the gear pump 76 will be operated to pump fluid, in opposite directions, through the passages 88 and 96.

Assuming the wheel 14 and fly wheel 36 to be rotating in the same diretcion but the wheel to be rotating faster (see arrows Figure 2), the gear pump will draw fluid in through passage 78 and force it out of passage 80. Assuming the converse, fluid will be drawn in through passage 80 and forced out through passage 78.

Passing now to the control valve 104 of this invention, it will be seen that this valve comprises a casing 106 which is provided with a relatively long, uniform diameter bore 108. A rigid, fluid-tight partition 110 divides this bore into two compartments 112 and 114, and compartment 112 reciprocably receives a first pressure responsive member or valve piston 116 and compartment 114 similarly receives a second pressure responsive member or plunger 118. The piston 116 and plunger 118 are rigidly interconnected by means of a small rod 120 which passes through a close-fitting opening in partition 110 thereby providing for simultaneous movement of both piston and plunger. The fit between rod 120 and said opening should be fluid-tight. Piston 116 divides compartment 112 into two variable volume chambers 122 and 124, and plunger 118 similarly divides its compartment into the two chambers 126 and 128. The outer end chambers 122 and 128 of these two separated compartments are interconnected by means of the passage 130 and port 132, this port opening into chamber 122. An outlet port 134 communicates with passage 130 and is adapted to be connected by suitable conduit 136 to brake actuator 24. A one-way safety check valve 138 biased to closed position by means of spring 139 is provided between passage 130 and passage 141 communicating with the upper end of chamber 122 to insure proper release of the brake as will be demonstrated hereafter. The upper end of chamber 122 is also ported at 140 for connection to a master cylinder 139' or similar device for developing braking pressure. A spring 142 is contained within chamber 122 to bear with a predetermined force on piston 116. It should be observed at this point that upward movement of piston 116 will serve to close or restrict the opening of port 132 into chamber 122.

A port 144 in casing 106 communicates with inner chamber 124 of compartment 112, and a similar port 146 communicates with the inner chamber 126 of compartment 114.

Another check valve arrangement 148 provided between a passage 149 communicating with end chamber 128 and port 146 is used to control the replenishment of fluid leaked from the pump mechanism 76. A helical spring 151 contained in a suitable bore 153 is arranged to act on valve 148 to normally close off chamber 128 from port 146 but to allow fluid to by-pass the valve when the system is in need of fluid replenishment.

Suitable conduit means 150 connects port 146 of valve 104 with passage 96 of pump 30, and conduit means 152 similarly connects passage 88 to port 144.

It should be noted at this point that the hydraulic circulatory system which includes the pump 76 is closed, or contained within itself, there being no outside liquid supply (other than the brake supply) for the system nor a reservoir as such for receiving used or leaked liquid from the system.

With this valve 104 so constructed and arranged, controlled brake pressure may be fed into port 140 and chamber 122 from which this pressure flows through opening 132 to the brake actuator 24 for applying the brake. The same pressure is also communicated through the pasage 130 to chamber 128 against plunger 118. By injecting a pressure through port 144 into chamber 124 where it acts against the bottom of valve piston 116, this latter piston may be moved upwardly to either restrict or cover the opening 132 thereafter reducing or preventing communication of the pressure injected at port 140 to the actuator 24. It is to be noted that the upper lip of the piston 116 normally rests at the lower edge of the opening 132 so that the slightest movement of piston 116 will restrict opening 132. The strength of the spring 142 is made to suit requirements, and in general is of such value which will counter-balance a given pressure in chamber 124 which is just below that desired to first move the piston 116 upwardly. When the pressure in chamber 124 is sufficient to move said piston 116 upwardly to completely close port 132, the plunger 118 is accordingly moved upwardly thereby expanding the volume of chamber 128. Pressure fluid present in actuator 24 may then pass through the passage 130 and into this enlarged chamber 128 thereby gradually relieving the brake applying pressure of actuator 24. Taking the converse situation, fluid pressure injected into chamber 126 by means of the port 146 will act downwardly against plunger 118 thereby completely opening the port 132 for direct communication between port 140 and actuator 24.

Figure 2:
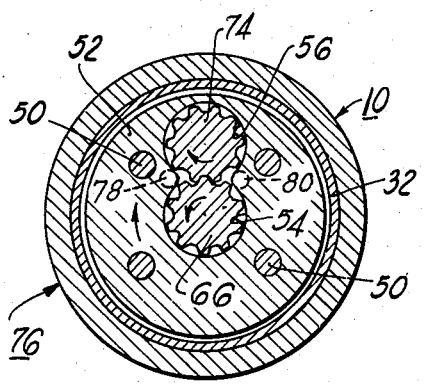
Figure 2 is a partial section of Figure 1 taken substantially on section line 2—2.

Referring now to the operation in general of the present invention, and assuming this mechanism to be used on aircraft, the control valve 104 may be mounted on a stationary part of the landing gear strut near the axle 10. Assuming that the aircraft is in flight and approaching the airport for a landing, the wheel 14 and the fly wheel 36 will be stationary. The moment the wheel touches the ground, it will be spun and will rotate with it the pump housing 34. Referring to Figure 2, the directions indicated by the arrows designate the direction of relative rotation of the various parts, since the fly wheel, if rotating at all, will, because of its inertia, rotate at a slower speed than the wheel 14. The gear pump 76 will then collect liquid from the passage 78 and deliver it through the passage 80, passage 96, line 150, port 146, into chamber 126 where it acts downwardly against plunger 118. The piston 116 will thereby be forced to its illustrated position completely opening communication between control valve port 140 and actuator 24. Inasmuch as this fluid flowing into chamber 126 has no outlet, it is obvious that a relatively high pressure will almost immediately be developed in passage 80 and the aforementioned passages and lines connected thereto. When this pressure reaches a high enough value, the gear pump pinions 66 and 74 will be virtually locked together against relative or pumping rotation whereby the pinion 66 and fly wheel 36 will be forced to rotate in substantial synchronism with the wheel 14.

Now assuming that it is desired to obtain any value of braking force up to maximum deceleration of the wheel 14 without causing it to skid, a brake-applying pressure is introduced through chamber port 140 into chamber 122 from which it flows to the brake actuator 24 to apply the brake. Wheel 14 is thereby retarded in its rotation, and if this value of retardation exceeds the predetermined rate, the mechanism of this invention functions to release part of the pressure acting in actuator 24 and thereby reduce this value. As the wheel 14 slows down, the fly wheel 36 because of its inertia will tend to rotate at its prior speed which is faster than that of the wheel 14. The gear pump 76 will now be operated to collect fluid from passage 80 and deliver it through passage 78, passage 88, line 152, port 144, and into chamber 124 where it acts upwardly against piston 116. When the relative rotation between wheel 14 and fly wheel 36 is sufficient to produce a pressure in chamber 124 which overcomes the spring 142, the piston 116 will be moved upwardly to either restrict or entirely cover the opening 132 and to expand the chamber 128. The brake-applying pressure fed into port 140 experiences reduced or severed communication with actuator 24, and a portion of the pressure in actuator 24 which is causing the excessive deceleration is released back through passage 130 into the enlarged chamber 128. The brake-applying torque is thereupon reduced allowing the wheel 14 to increase slightly its speed, or stated in other words, the rate of deceleration of the wheel 14 will be slightly reduced, thereby reducing the speed of relative rotation between wheel 14 and fly wheel 36. Gear pump 76 thereupon produces a lesser output pressure which permits piston 116 under the influence of spring 142 to tend to open the port 132. The brake-applying pressure may once again be freely or partially communicated to actuator 24 depending upon the degree of movement of the piston 16.

A fuller appreciation of the desirable features of this invention is made possible by understanding how the modulated braking pressures are attained and how the general functioning of the prior art devices did not bring about such modulated conditions. As stated earlier, prior art devices caused a sudden drop in braking pressure to prevent skidding which obviously resulted in the brake being "on" one moment, "off" the next, "on" the next, etc. The pressures controlled by this invention do not fluctuate between such "on-off" conditions, but are maintained substantially steady. This steady-state condition is primarily due to the fact that the relief of the excessive braking pressure is controlled and allowed to reduce only in accordance with design preferences.

Assuming now a maximum deceleration condition, as explained previously the pump 76 pressure is communicated to the underside of piston 116 in opposition to the force of spring 142 which actually determines the rate of deceleration of wheel 14, since once the maximum predetermined rate is reached or possibly exceeded, the pump 76 pressure is sufficient to overcome spring 142 and force piston 116 to cover port 132. As plunger 118 moves upwardly with piston 116 thereby expanding chamber 128, fluid pressure from actuator 24 is released into this chamber thereby reducing the decelerating or braking pressure. The wheel thereupon tends to pick-up slightly in speed, the net effect being to either reduce or maintain constant the pump 76 pressure acting on piston 116. Thereafter, as the relative rotational speed between wheel 14 and fly wheel 36 varies, piston 116 will correspondingly raise or lower (without uncovering port 132) causing variation in the volume of chamber 128. The actuator 24 pressure is therefore dependent upon the position of piston 116 which is effectively controlled by the rate of deceleration of wheel 14. Since the volume of chamber 128 is controlled by the rate of deceleration of wheel 14, the pressure in actuator 24 is correspondingly regulated. All of these operations, while explained as occurring in definite steps, are mutually interdependent so that the various specified pressures and movements may be characterized as a balancing of pressures to produce the desired result. This balancing condition obviously differs from the aforementioned "on-off" control and results in almost steady-state, maximum decelerating pressure in actuator 24.

Thus it is seen that skidding of the wheel 14 may be prevented, and the rate of deceleration of this wheel 14 may be definitely controlled. With this arrangement, the variation of braking pressure appearing at actuator 24 will be relatively smooth or constant, thereby overcoming the objectionable feature of prior art devices which allowed violent fluctuation of the pressure reaching the actuator 24. With this modulated pressure condition, the brake is more uniformly applied obviously conducing to a more uniform and efficient exertion of brake-applying forces on the wheel 14.

With this arrangement, the fluid system may be further characterized as closed inasmuch as no outside source of supply or drain is necessary in order to make the mechanism operable. This reduces to a minimum the hydraulic lines needed, and of course weight, which are highly desired features of any mechanism intended for use on aircraft.

Should the piston 116 be covering port 132 during a braking application, and the braking pressure suddenly released, the check valve 138 would be lifted off its seat against the load of spring 139 allowing the pressure in the actuator 24 to return to chamber 122 via passage 141 and the associated brake pressure-developing devices.

If the fluid in the pump 76 and/or lines 150, 152 should leak out (such as during aircraft flight), the succeeding brake application will result in fluid being forced down passage 130 of valve 104, past one-way ball valve 148 and into line 150. This replenishment action causes the entire pump and valve system to be completely filled thus readying it for effective control of the rate of deceleration.

Normal release of the brakes is simple, with the brake-applying pressure in actuator 24 being discharged through line 136, port 134, and port 132 into chamber 122 and the associated brake-applying devices.

Although only one embodiment of the invention has been illustrated and described, various changes in the form and relative arrangements of the parts may be made to suit requirements.

I claim:

1. A hydraulic inertia control device comprising a motor, means for communicating a selected pressure to said motor, a rotary member, a co-axial rotary inertia element, a constant volume displacement pump drivably interconnecting said element and said member together for either synchronous or relative rotation, said pump being disposed at the axis of said element and member, a piston member arranged to control the aforementioned communication to said motor, and means operatively interconnecting said pump with said piston member, said piston member being actuable by pressure produced by said pump upon relative rotation between said element and said member in order to modulate the pressure communicated to said motor.

2. A hydraulic inertia control device comprising a motor, means for communicating a selected pressure to said motor, a rotary member, a rotary inertia element, a reversible pump drivably interconnecting said element and said member together for either synchronous or relative rotation, a piston member arranged to control the aforementioned communication to said motor in modulated amounts, and conduits operatively interconnecting said pump and said piston member, said piston member being actuable by pressure produced by said pump upon relative rotation between said element and said member whereby pressure communicated to said motor is modulated.

3. A hydraulic inertia control device comprising a motor, means for communicating a selected pressure to said motor, a rotary member, a co-axial rotary inertia element, a displacement pump disposed at the axis of said element and said member for drivably interconnecting said element and said member together for either synchronous or relative rotation, a piston member controlling in modulated amounts the aforementioned communication to said motor, said piston member being normally actuable by a force produced by said pump upon relative rotation between said element and said member, and means yieldably acting on said piston member in opposition to the actuating force of said pump to prevent the aforementioned control of said communication until said actuating pressure attains a predetermined value.

4. A hydraulic inertia control device comprising a motor, means for communicating a selected pressure to said motor, a rotary member, a rotary inertia element, a constant volume displacement pump interconnecting said element and said member together for either synchronous or relative rotation, a first piston member controlling the aforementioned communication to said motor, a closed hydraulic system operatively interconnecting said pump and said first piston member, said first piston member being actuable by said pump upon relative rotation in one direction between said element and said member, and a second piston member in said hydraulic system operatively connected to said first piston member, said second piston member being actuable in opposition to actuation of said first piston member, said second piston member being actuated by pressure produced by said pump upon relative rotation between said element and said rotary member in a direction opposite to said one direction.

5. A hydraulic inertia control device for use in limiting the braking torque applied to a wheel to a predetermined value comprising rotatable brake means, non-rotatable brake means arranged for frictional engagement with said rotatable brake means, a motor operable to effect said frictional engagement, means for communicating a modulated actuating pressure to said motor, a rotary inertia element, a reversible pump operatively interconnecting said element and said rotatable brake means together for either synchronous or relative rotation, a piston member arranged to restrict by degrees the aforementioned communication to said motor, and conduits operatively interconnecting said pump with said piston member, said piston member being actuable by pressure produced by said pump upon relative rotation between said element and said rotatable brake means.

6. A hydraulic inertia control device for use in controlling by degrees the braking torque applied to a wheel comprising rotatable brake means, non-rotatable brake means arranged for frictional engagement with said rotatable brake means, a motor supported to effect said frictional engagement, means for communicating a selected actuating pressure to said motor, a rotary inertia element, a reversible pump operatively interconnecting said element and said rotatable brake means together for either synchronous or relative rotation, a tandem piston member arranged to modulate the aforementioned communication to said motor, said tandem piston member being normally actuable by a force produced by said pump upon relative rotation between said element and said rotatable brake means, conduits operatively interconnecting said pump with said tandem piston and means yieldably acting on said tandem piston in opposition to the actuating force of said pump to prevent the aforementioned modulation of said communication until said actuating pressure attains a predetermined value.

7. A hydraulic inertia control device for use in modulating the braking torque applied to a wheel to a predetermined value comprising rotatable brake means, non-rotatable brake means arranged for frictional engagement with said rotatable brake means, a motor operable to effect said frictional engagement, means for communicating a selected actuating pressure to said motor, a rotary inertia element, a constant displacement pump drivably interconnecting said element and said rotatable brake means together for either synchronous or relative rotation a tandem arranged first and second piston member arranged to control the aforementioned communication to said motor, a closed hydraulic system operatively interconnecting said pump and each of said tandem arranged piston members, one of said tandem arranged pistons members being actuable by pressure produced by said pump upon relative rotation in one direction between said element and said rotatable brake means, and the second of said tandem arranged pistons being connected in said hydraulic system and actuable in opposition to actuation of said first tandem arranged piston member, said second tandem arranged piston being actuated by pressure produced by said pump upon relative rotation between said element and said rotatable brake means in a direction opposite to said one direction.

8. For use in a brake assembly, a rotatable wheel, a fluid pressure source, a brake pressure control device comprising a hydraulic actuator for the brake, a rotary inertia element, a constant volume displacement pump arranged to operatively interconnect said element and the wheel together for either synchronous or relative rotation, and a valve device arranged to modulate pressure from said pressure source to said actuator and having first and second compartments therein, each compartment having a pressure responsive partition which defines two variable volume chambers, said partitions being connected to move together, one chamber in the first compartment communicating with said actuator while the other chamber in the same compartment communicates with said pump, one chamber in the second compartment communicating with said pump while the other chamber in the same compartment communicates with said actuator, the partition in said first compartment being slidable to throttle fluid flow from said pressure source to said actuator, said compartments and partitions therein and the communications with said pump being constructed so that when said wheel rotates faster than said element said pump will produce a pressure which is communicated to said second compartment to act on the partition therein to provide uncontrolled communication between said one chamber of said first compartment and said actuator, and when said element rotates faster than said wheel said pump will produce a pressure which is communicated to said first compartment where it will act on the partition therein to throttle and thereby reduce the pressure acting in said actuator.

9. For use with a brake assembly, a rotatable wheel, a fluid pressure source, a hydraulic actuator for the brake operatively connected with said fluid pressure source, a rotary inertia element, a constant volume displacement pump arranged to operatively interconnect said element and the wheel together for either synchronous or relative rotation, and a valve device arranged to modulate pressure communicated from said fluid pressure source to said actuator and having first and second compartments therein, each compartment having a pressure responsive partition which defines two variable volume chambers, said partitions operatively connected to move together, one chamber in the first compartment communicating with said actuator and pressure source while the other chamber in the same compartment communicates with said pump, one chamber in the second compartment communicating with said pump while the other chamber in the same compartment communicates with said actuator, the partition in said first compartment being slidable to restrict communication between said fluid pressure source and said actuator through said one chamber, means yieldably urging said partitions to such a position as to provide substantially unrestricted communication between said fluid pressure source and said actuator, the arrangement of said compartments and the respective partitions and the communications with said pump being such that when said wheel rotates faster than said element said pump will produce a pressure which is communicated to said second compartment to act on the partition therein to provide unrestricted communication between said pressure source and said actuator, and when said element rotates faster than said wheel said pump will produce a pressure which is communicated to said first compartment where it will act on the partition therein to restrict the pressure transmitted from the first compartment to said actuator.

10. For use with a brake assembly, a wheel, a hydraulic actuator for the brake, a brake pressure control device comprising a non-rotatable supporting member arranged to be concentrically located with respect to the wheel, a rotary inertia element adapted to be coaxially positioned with respect to the wheel and rotatably supported by said non-rotatable member, a gear pump comprised of two meshed pinions one of which is coaxially rotatable with said inertia element and the other of which is adapted to be rotatable with the wheel and about the axis of rotation of said inertia element, and a valve device arranged to communicate actuating pressure to said actuator and having a uniform diameter bore which is divided into two fluid tight compartments by a partition, each compartment reciprocably receiving a plunger which divides the compartment into two variable volume chambers, said plungers being connected together by means of a stem which reciprocably passes through said partition, the opposite end chambers of said compartments being in communication with said actuator, the end chamber in the first compartment having its communication with said actuator controlled by the respective plunger, a spring in said first compartment biasing the respective plunger in a direction to provide the aforementioned communication between the actuator and the respective end chamber, the inner chamber of said first compartment being in communication with one side of said pump while the inner chamber of said second compartment is in communication with the other side of said pump, said pump and said valve device being cooperatively arranged in such a manner that when the wheel rotates faster than said inertia element, pressure developed by said pump will be transmitted to the inner chamber of said second compartment thereby forcing the plungers to a position to provide uncontrolled communication of pressure from the valve device to the actuator and also to force said inertia element to rotate with the wheel, and that when said inertia element rotates faster than the wheel, pressure developed by said pump will be transmitted to the inner chamber of said first compartment thereby forcing the plungers to a position which interferes with the communication of pressure through the valve device to said actuator and will allow the pressure in the actuator to reduce to predetermined value.

11. For use with a brake assembly, a wheel, a hydraulic actuator for the brake, a brake pressure control device comprising a non-rotatable supporting member concentrically located with respect to the wheel, a rotary inertia element adapted to be coaxially positioned with respect to the wheel and rotatably supported with respect to said non-rotatable member, a gear pump comprised of two meshed pinions one of which is coaxially rotatable with said inertia element and the other of which is arranged for rotation with the wheel and about the axis of rotation of said inertia element, and a valve device arranged to communicate actuating pressure to said actuator and having a uniform diameter bore which is divided into two fluid tight compartments by a partition, each compartment reciprocably receiving a plunger which divides the compartment into two variable volume chambers, said plungers being connected together by means of a stem which reciprocably passes through said partition, the opposite end chambers of said compartments having conduit connections with said actuator, communication by means of the conduit connection between the end chamber of said first compartment being controlled by the first compartment plunger, means yieldably urging this first compartment plunger to a position to provide uncontrolled communication between the respective end chamber and said actuator, conduit means connecting the inner chamber of said first compartment to one side of said pump, conduit means connecting the inner chamber of said second compartment to the other side of said pump, said pump and said valve device being cooperatively arranged in such a manner that when the wheel rotates faster than said inertia element, pressure developed by said pump will be transmitted to the inner chamber of said second compartment thereby forcing the plungers to a position to provide uncontrolled communication of pressure from the valve device to the actuator and also to force said inertia element to rotate with the wheel, and that when said inertia element rotates faster than the wheel, pressure developed by said pump will be transmitted to the inner chamber of said first compartment thereby forcing the plungers to a position which interferes with the communication of pressure through the valve device to said actuator and will allow the pressure in the actuator to reduce to a predetermined value.

12. For use with a wheel and brake assembly, a brake pressure control device comprising a control valve separated first and second compartments, each compartment reciprocably receiving a plunger which defines two variable volume chambers, means connecting said plungers together for simultaneous movement, the first chamber of one compartment having communication with the first chamber of the other compartment, the plunger in the first compartment being arranged to control this communication, the second chambers of both compartments having separate means for communicating fluid pressure thereto, and fluid pressure producing means alternatively transmitting fluid pressure to the second chamber of said first compartment whereby said plungers will be moved in such a direction as to control the communication between said first chambers, and to the second chamber of said second compartment whereby said plungers will be moved in such a direction as to provide substantially unrestricted communication between said first chambers.

13. For use with a wheel and brake assembly, a brake pressure control device comprising a control valve having separated first and second compartments, a valve piston reciprocably received in the first compartment and dividing said compartment into first and second variable volume chambers, a fluid pressure responsive plunger reciprocably received in the second compartment and dividing said compartment into first and second variable volume chambers, means connecting said piston and said plunger together for simultaneous movement, the first chambers of said compartment being in communication, said valve piston being movable to control this communication, and fluid pressure producing means arranged to transmit fluid pressure to the second chamber of one compartment at one time and to the second chamber of the other compartment at another time, the fluid pressure transmitted to said second chambers serving to move said valve piston for controlling the communication between said first chambers.

14. For use with a wheel and brake assembly, a brake pressure control device comprising a hydraulic actuator for the brake, a rotary inertia element, a constant volume displacement pump operatively interconnecting said element and the wheel, and a valve device for communicating selected pressure to said actuator and having compartments therein, fluid pressure responsive members received in said compartments and displaced therein to control the transmittance of fluid pressure to said actuator, and conduit means interconnecting said pump with said compartments whereby relative rotation between the wheel and said inertia element will cause said pump to develop a pressure which acts on said pressure responsive members and thereby serves to control the communication of pressure to said actuator.

15. For use with a wheel and brake assembly, a brake pressure control device comprising a non-rotatable supporting member arranged to be concentrically located with respect to the wheel, a rotary inertia element adapted to be coaxially positioned with respect to the wheel and rotatably supported on said non-rotatable member, a gear pump comprised of two meshed pinions one of which is coaxially rotatable with said inertia element and the other of which is adapted to be rotatable with the wheel about the axis of rotation of said inertia element, two hydraulic fluid ports one located on each side of said two meshed pinions each being adapted to provide alternatively fluid inlet or outlet depending on the direction of pinion rotation, and a casing having two axially extending bores of different lengths fixedly attached to said gear casing, said bores connecting said ports to provide hydraulic conduits of different lengths for communication with said pinion gears.

16. For use with a wheel and brake assembly, rotatable brake means, non-rotatable brake means arranged for frictional engagement with said rotatable brake means, a hydraulic motor operable to affect said frictional engagement, hydraulic means for communicating a selected actuating pressure to said motor, a rotary inertia element, and a constant volume displacement pump disposed at the axis of said wheel for drivably interconnecting said element and said rotatable brake means together for either synchronous or relative rotation.

References Cited in the file of this patent

UNITED STATES PATENTS

| | | |
|---|---|---|
| 288,728 | Orton | Nov. 20, 1883 |
| 1,914,645 | Power et al. | June 20, 1933 |
| 2,020,773 | Ernst | Nov. 12, 1935 |
| 2,038,146 | Cook et al. | Apr. 21, 1936 |
| 2,038,148 | Cook et al. | Apr. 21, 1936 |
| 2,039,701 | Bush | May 5, 1936 |
| 2,393,031 | Eksergian | Jan. 15, 1946 |
| 2,491,666 | Keller | Dec. 20, 1949 |

UNITED STATES PATENT OFFICE

CERTIFICATE OF CORRECTION

Patent No. 2,904,135            September 15, 1959

Franklin C. Albright

It is hereby certified that error appears in the printed specification of the above numbered patent requiring correction and that the said Letters Patent should read as corrected below.

Column 2, line 51, for "with" read -- the --; column 3, line 9, for "is turn" read -- in turn --; column 5, line 34, for "16" read -- 116 --; column 8, line 61, after "partitions" insert -- being --; column 10, line 25, after "valve" insert --having --; line 70, for "displaced" read -- displaceable --.

Signed and sealed this 6th day of September 1960.

(SEAL)
Attest:

ERNEST W. SWIDER
Attesting Officer

ROBERT C. WATSON
Commissioner of Patents